(12) United States Patent
Zhu

(10) Patent No.: US 10,489,435 B2
(45) Date of Patent: Nov. 26, 2019

(54) METHOD, DEVICE AND EQUIPMENT FOR ACQUIRING ANSWER INFORMATION

(71) Applicant: SHANGHAI XIAOI ROBOT TECHNOLOGY CO., LTD., Shanghai (CN)

(72) Inventor: Pinpin Zhu, Shanghai (CN)

(73) Assignee: SHANGHAI XIAOI ROBOT TECHNOLOGY CO., LTD., Shanghai (CN)

( * ) Notice: Subject to any disclaimer, the term of this patent is extended or adjusted under 35 U.S.C. 154(b) by 586 days.

(21) Appl. No.: 15/145,430

(22) Filed: May 3, 2016

(65) Prior Publication Data
US 2016/0328469 A1 Nov. 10, 2016

(30) Foreign Application Priority Data
May 4, 2015 (CN) .......................... 2015 1 0225400

(51) Int. Cl.
*G06F 17/30* (2006.01)
*G06F 16/33* (2019.01)
*G06F 17/27* (2006.01)

(52) U.S. Cl.
CPC ...... *G06F 16/3344* (2019.01); *G06F 17/2705* (2013.01); *G06F 17/2785* (2013.01)

(58) Field of Classification Search
CPC ........... G06F 17/30684; G06F 17/2705; G06F 17/30734; G06F 17/2872; G06F 17/2881
USPC ........................................................ 707/771
See application file for complete search history.

(56) References Cited

U.S. PATENT DOCUMENTS

| | | | | |
|---|---|---|---|---|
| 7,840,400 B2 * | 11/2010 | Lavi | ................... | G06F 17/2785 704/9 |
| 8,117,178 B2 | 2/2012 | Qi et al. | | |
| 8,332,394 B2 * | 12/2012 | Fan | .......................... | G06N 5/02 707/723 |

(Continued)

FOREIGN PATENT DOCUMENTS

| | | |
|---|---|---|
| CN | 101030267 A | 9/2007 |
| CN | 101398835 A | 4/2009 |
| CN | 102541924 A | 7/2012 |

OTHER PUBLICATIONS

Office Action regarding Chinese Patent Application No. 201510225400.7, dated Feb. 5, 2018. Translation provided by Unitalen Attorneys at Law.

*Primary Examiner* — Jean M Corrielus
(74) *Attorney, Agent, or Firm* — Harness, Dickey & Pierce, P.L.C.

(57) ABSTRACT

Method, device and equipment for acquiring answer information are provided. The method includes: acquiring a text sequence to be processed from a user equipment; dividing the text sequence into a plurality of word segments and obtaining semantic information of at least one of the plurality of word segments; performing a search in at least one of the plurality of sub-databases for matching the semantic information, successively from high to low in priority of the sub-databases, till an initial answer information matching the semantic information is found; and providing an established answer information corresponding to the initial answer information to the user equipment. Based on better semantic understanding to the text sequence, more accurate answer information may be provided.

19 Claims, 3 Drawing Sheets

(56) References Cited

U.S. PATENT DOCUMENTS

| | | | |
|---:|---|---|---|
| 9,747,390 B2 * | 8/2017 | Cooper | G06F 17/2735 |
| 2003/0074353 A1 * | 4/2003 | Berkan | G06F 16/3344 |
| 2007/0168335 A1 | 7/2007 | Moore et al. | |
| 2007/0198319 A1 * | 8/2007 | Sciuk | G06Q 10/06316 |
| | | | 705/7.26 |
| 2007/0198366 A1 * | 8/2007 | Sciuk | G06Q 10/1053 |
| | | | 705/26.8 |
| 2008/0154581 A1 * | 6/2008 | Lavi | G06F 17/277 |
| | | | 704/9 |
| 2009/0089282 A1 * | 4/2009 | Qi | G06F 17/30684 |
| 2009/0327249 A1 * | 12/2009 | Pappas | G06F 17/30392 |
| 2012/0078902 A1 * | 3/2012 | Duboue | G06F 16/334 |
| | | | 707/736 |
| 2018/0046705 A1 * | 2/2018 | Murdock, IV | G06F 16/334 |

\* cited by examiner

METHOD, DEVICE AND EQUIPMENT FOR ACQUIRING ANSWER INFORMATION

CROSS-REFERENCE TO RELATED APPLICATIONS

This application claims the benefit of priority to Chinese Patent Application No. 201510225400.7, filed on May 4, 2015, the entire disclosure of which is incorporated herein by reference.

TECHNICAL FIELD

The present disclosure generally relates to computer technology field, and more particularly, to a method, a device and an equipment for acquiring answer information.

BACKGROUND

In existing question-answering systems, answers are generally provided to users directly based on text information of questions raised by the users. However, as natural languages are relatively complicated in practice, the provided answers in the existing question-answering systems are prone to be influenced by expression ways of the questions raised by the users.

SUMMARY

In embodiments of the present disclosure, a method, a device and an equipment for acquiring answer information are provided.

In an embodiment of the present disclosure, a question-answering device, included in a computer equipment, for acquiring answer information based on a predetermined knowledge database is provided, wherein the predetermined knowledge database includes a plurality of sub-databases, and the question-answering device includes a first acquiring device configured to acquire a text sequence to be processed from a user equipment; a semantic device configured to divide the text sequence into a plurality of word segments and obtain a semantic information of at least one of the plurality of word segments; a retrieval device configured to perform a search in at least one of the plurality of sub-databases for matching the semantic information, successively from high to low in priority of the sub-databases, till an initial answer information matching the semantic information is found; and a first providing device configured to provide an established answer information corresponding to the initial answer information to the user equipment.

In an embodiment of the present disclosure, a method for acquiring answer information based on a predetermined knowledge database in a computer equipment is provided, wherein the predetermined knowledge database includes a plurality of sub-databases, and the method includes: a) acquiring a text sequence to be processed from a user equipment; b) dividing the text sequence into a plurality of word segments and obtaining a semantic information of at least one of the plurality of word segments; c) performing a search in at least one of the plurality of sub-databases for matching the semantic information, successively from high to low in priority of the sub-databases, till an initial answer information matching the semantic information is found; and d) providing an established answer information corresponding to the initial answer information to the user equipment.

Compared with the existing techniques, embodiments of the present disclosure may have following advantages. First, more accurate answer information may be provided based on better semantic understanding to the text sequence. Second, resource consumption caused by search may be reduced by searching among the sub-databases based on priority order. Third, parameters can be obtained based on the text sequence acquired from the user equipment, so as to supplement the answer information to be provided to the user equipment, which makes the answer information more adaptive to the questions from the user equipment. Fourth, when an answer information with a relatively high matching rate is obtained, the answer information is determined to be the initial answer information and the search process is terminated, which may reduce resource consumption; and when a plurality of answer information with a relatively passable matching rate are obtained, the initial answer information may be determined by inquiring the user, to ensure the initial answer information is the one the user expects. Fifth, the priority order of the sub-databases can be adjusted according to different semantics, so that the priority order of the sub-databases may conform to practical semantic situations better. Sixth, the text sequence to be processed may be supplemented based on historical search of the user, so that semantics can be supplemented and understood automatically in case the text sequence acquired from the user is incomplete; and by limiting a trigger condition of acquiring historical search information of the user, the computer equipment is activated to supplement the text sequence only in appropriate situations, which may avoid or reduce the possibility of crash of the computer equipment caused by continuous search to the historical search information. Seventh, for abundant ontology instances having similar properties, it is unnecessary to construct properties for each of the ontology instances, and ontology instances may be created simply by inheriting all the properties of the ontology, which may greatly reduce resource consumption in a procedure for creating the ontology instances.

BRIEF DESCRIPTION OF THE DRAWINGS

By reading detailed description of embodiments of present disclosure in conjunction with accompanying drawings, the characteristics, objects and advantages of the present disclosure will be more clarified.

In the drawings, the same or similar parts have the same or similar reference numerals.

DETAILED DESCRIPTION

Hereinafter, embodiments of present disclosure are described in detail in conjunction with accompanying drawings.

Figure 1:
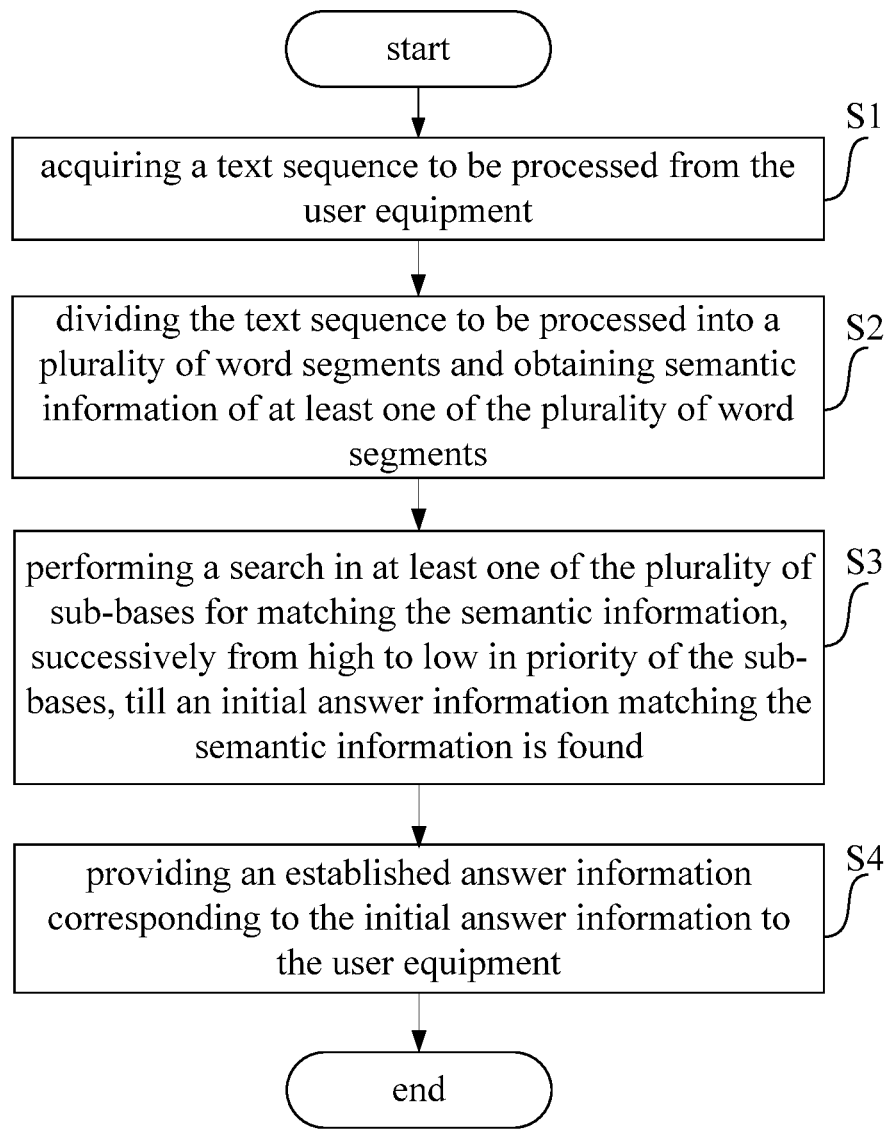
FIG. 1 schematically illustrates a flow chart of a method for acquiring answer information according to an embodiment of the present disclosure.

FIG. 1 schematically illustrates a flow chart of a method for acquiring answer information according to an embodiment of the present disclosure. The method may be implemented mainly by a computer equipment which includes but not limited to a network device and a user equipment. The network device includes but not limited to a single network server, a server group consisting of multiple network servers or a cloud-computing-based cloud consisting of abundant computers or network servers. Cloud computing is a kind of distributed computing, where a group of loosely coupled computer sets constitute a super virtual computer. The user equipment includes but not limited to a Personal Computer (PC), a tablet personal computer, a smart phone, a Personal Digital Assistant (PDA) or Internet Protocol Television (IPTV). Networks where the computer equipment is located include but not limited to Internet, Wide Area Network (WAN), Metropolitan Area Network (MAN), Local Area Network (LAN), Virtual Private Network (VPN), etc.

It should be noted that, the above computer equipment and networks are only listed for exemplary purposes, and other existing or future possibly emerging computer equipment or networks, as long as applicable to the present disclosure, should also be included within a protection scope of the present disclosure, which are incorporated herein by reference.

In some embodiments, the method for acquiring answer information is based on a predetermined knowledge database, and includes S1, S2, S3 and S4.

In S1, the computer equipment acquires a text sequence to be processed from the user equipment.

In some embodiments, the text sequence to be processed may be input directly by a user, or obtained by recognizing a speech input by a user.

For example, the user inputs a text sequence "how is the weather today", and presses a send button to instruct the user equipment to send the text sequence to the computer equipment. The text sequence "how is the weather today" is the text sequence to be processed from the user equipment.

For another example, after the user inputs a speech in an application, the speech is sent to the computer equipment through internet by the application, and the computer equipment may recognize the speech to acquire a text sequence "how is the weather today". The text sequence "how is the weather today" is the text sequence to be processed from the user equipment.

It should be noted that, the above examples are described for better explaining solutions of the present disclosure, but should not limit a scope of the present disclosure. Those skilled in the art would understand that any ways for acquiring the text sequence to be processed from the user equipment fall into the scope of the present disclosure.

Afterwards, in S2, the computer equipment divides the text sequence to be processed into a plurality of word segments and obtains a semantic information of at least one of the plurality of word segments.

In some embodiments, a semantic information of a word segment includes information which can represent semantic of the word segment and can be recognized by the computer equipment. In some embodiments, the semantic information of the word segment includes but not limited to at least one of the followings.

1) A synonym of the word segment and/or a combination of synonyms of the word segment
For example, the semantic information of the word segment "weather" includes its synonym, such as "climate".
2) A word that belongs to a same class with the word segment and/or a combination of words that belong to the same class with the word segment The same class represents all the words belong to a same class with the word segment. In some embodiments, if the word segment is a toponym, the word belonging to the same class with the word segment may include other toponyms. For example, the semantic information of the word segment "Shanghai" may include, such as "Beijing" or "Tianjin".
3) An entity having a same or similar structure with the word segment The entity having the same or similar structure with the word segment means the entity having an information structure same as or similar to the information structure of the word segment. In some embodiments, the entity may be a special semantic expression.

For example, if the word segment is a specific time structure "ten forty-five on Jan. 1, 2013", the entity having the same or similar structure with the word segment may be a semantic expression of date "XXX clock XXX minutes on XXX date of XXX month in XXX year". This kind of special semantic expression may further include a personal name, an address or a phone number.

It should be noted that, the above examples are described for better explaining solutions of the present disclosure, but should not limit the scope of the present disclosure. Those skilled in the art would understand that any information representing semantic of a word segment which can be recognized by a computer falls into the scope of the present disclosure.

There are a plurality of ways for the computer equipment to divide the text sequence to be processed into the plurality of word segments and obtain a semantic information of at least one of the plurality of word segments.

In some embodiments, the computer equipment may divide the text sequence to be processed into the plurality of word segments in many ways, and match a particular word segment among the plurality of word segments with a word which corresponds to a semantic information obtained in advance, and determine semantic information of the word to be the semantic information of the particular word segment if the word successfully matches the particular word segment.

In some embodiments, after the word which successfully matches the particular word segment is determined, the semantic information of the word is further processed based on context of the particular word segment in the text sequence to be processed, to determine the accurate semantic information of the particular word segment.

It some embodiments, the computer equipment may obtain the semantic information of each of the plurality of word segments, or the semantic information of a portion of the plurality of word segments. For example, the computer equipment may not obtain the semantic information of those meaningless word segments.

It should be noted that, the above examples are described for better explaining solutions of the present disclosure, but should not limit the scope of the present disclosure. Those skilled in the art would understand that any methods for dividing the text sequence to be processed into a plurality of word segments and obtaining semantic information of at least one of the plurality of word segments fall into the scope of the present disclosure.

In S3, the computer equipment performs a search in at least one of the plurality of sub-databases for matching the semantic information, successively from high to low in priority of the sub-databases, till an initial answer information matching the semantic information is found.

In some embodiments, the plurality of sub-databases include matching information which are used to match the semantic information of the word segments and correspond to initial answer information. Therefore, the computer equipment performs the search to the matching information in the plurality of sub-databases for matching the semantic information of the word segments, to determine the initial answer information corresponding to the semantic information of each word segment. In some embodiments, the matching information may be affirmative or negative. The affirmative matching information indicates that if a particular semantic information of a particular word segment matches or has a higher matching rate with the affirmative matching information, it is more likely that initial answer information which corresponds to the affirmative matching information is the initial answer information of the particular semantic information. On the contrary, the negative matching information indicates that if a particular semantic information of a particular word segment matches or has a higher matching rate with the negative matching information, it is less likely that initial answer information which corresponds to the negative matching information is the initial answer information of the particular semantic information.

In some embodiments, the initial answer information may include but not limited to following information.

1) answer information which can be provided to the user directly, where the answer information may be complete and presented to the user directly or after being executed by the user equipment.

This kind of answer information includes, for example, a plain text, plain multi-media information, multi-media information with an extended label or executable information. The extended label is optional to the user (e.g., by a click of the user) and is linked to other information. The executable information includes any information that is capable of being executed by the user equipment, such as functions or instructions.

2) answer information which cannot be provided to the user directly, where the answer information may be incomplete, and before being presented to the user, the answer information needs to be supplemented, or needs to be supplemented and operated by the user equipment.

This kind of answer information includes, for example, a plain text with a default item, plain multi-media information with a default item, multi-media information with a default extended label or executable information with a default parameter.

It should be noted that, the above examples are described for better explaining solutions of the present disclosure, but should not limit the scope of the present disclosure. Those skilled in the art would understand that any answer information which can be obtained by semantic matching falls into the scope of the present disclosure.

In some embodiments, the priority order of the plurality of sub-databases may be predetermined, or may be determined, by the computer equipment, based on the semantic information through various methods. In some embodiments, the computer equipment may determine the priority order of the sub-databases used in S3 based on category of the word segments in combination with predetermined priority order of the sub-databases under different categories of sub-databases. In some embodiments, the computer equipment may adjust the predetermined priority order of the sub-databases based on whether the semantic information includes an entity conforming to a specific structure, so as to obtain the priority order of the sub-databases used in S3. Therefore, according to different semantics, the priority order of the sub-databases may be adjusted to be more suitable for practical semantic situations.

In some embodiments, the computer equipment may perform a search in a first sub-database having the highest priority among the plurality of sub-databases. If the initial answer information is found in the first sub-database, the computer equipment may terminate the search process; or if the initial answer information cannot be found in the first sub-database, the computer equipment may perform a search in one or more second sub-database having the second highest priority among the plurality of sub-databases. And so on, till the computer equipment obtains the initial answer information.

In some embodiments, ways for the computer equipment, for realizing to perform the search in at least one of the plurality of sub-databases for matching the semantic information, successively from high to low in priority order of the plurality of sub-databases, till the initial answer information matching the semantic information is found may include but not limited to:

1) matching information in the sub-database includes sentences and/or words, and multiple sentences and/or words constitute a group which may correspond to one or more initial answer information. The computer equipment performs a search to the matching information in at least one of the plurality of sub-databases for matching the semantic information of each word, successively from high to low in priority of the sub-databases, till the initial answer information corresponding to the semantic information of each word segment is determined.

For example, in S2, two word segments "a ten-yuan local data traffic package" and "how is", and the semantic information of the two word segments are obtained from the text sequence "how is a ten-yuan local data traffic package". The computer equipment, first, performs a search to matching information in a first sub-database which has the highest priority among the plurality of sub-databases for matching the semantic information of the two word segments, but fails to find the matching information matching the semantic information of the two word segments. Afterwards, the computer equipment performs a search to matching information in a second sub-database having the second highest priority among the plurality of sub-databases for matching the semantic information of the two word segments, and determines that the semantic information of the two word segments matches a group of matching information consisting of three sentences "what service does a ten-yuan local data traffic package provide", and "excuse me, do you know a ten-yuan local data traffic package" and "what service can a ten-yuan local data traffic package provide to me". Thus, the computer equipment determines a plain text information of "a ten-yuan local data traffic package is a special offer of data traffic for XX user, and you only need to pay 10-yuan monthly fee to enjoy the special offer" corresponding to the group of matching information to be the initial answer information corresponding to the semantic information of the two word segments of "a ten-yuan local data traffic package" and "how is".

2) The computer equipment performs a search to multiple groups of semantic matching information in at least one of the plurality of sub-databases for matching the semantic information, successively from high to low in priority of the sub-databases, till a group of semantic matching information matching the semantic information is found, and determines answer information corresponding to the group of semantic matching information to be the initial answer information. Each group of semantic matching information includes at least one semantic matching structure. A semantic matching structure can be represented by a semantic expression. In some embodiments, the semantic matching structure may include but not limited to at least one of the followings: a) a plurality of words and semantic information of at least one of the plurality of words, where semantic information of a word is similar to semantic information of a word segment and not described in detail here; b) logic relations between the plurality of words, such as the sequencing of the plurality of words or restrictive relations of the plurality of words (for example, one word is a qualifier of another word).

For example, a group of semantic matching information includes three semantic matching structures "[data related?][the types of rain][about][weather region name][has or doesn't have][influence]", "[weather region name][weather related][or][the types of rain]" and "[search?][weather region name][date related|@time?][does or does not][need| can?][take an umbrella]", where "|" represents logic OR, and content in each bracket "[ ]" represents a word and/or semantic information of the word. For example, "take an umbrella" is a word, and "weather region name" is a special expression representing a word of regions.

In some embodiments, a standard question may be used to represent natural language meaning which is close in meaning to all the semantic matching information in a group of semantic matching information. The standard question may be included in the predetermined knowledge database, so that an operation person can understand the semantic of the group of semantic matching information. For example, the standard question for the above group of semantic matching information including the three semantic matching structures may be "will it rain today?"

In some embodiments, each group of semantic matching information may further include the type of each semantic matching structure. The type of a semantic matching structure indicates whether the semantic matching structure is affirmative or negative. The affirmative semantic matching structure indicates that if a particular semantic information of a particular word segment matches or has a higher matching rate with the affirmative semantic matching structure, it is more likely that initial answer information which corresponds to the semantic matching information including the affirmative semantic matching structure is the initial answer information of the particular semantic information. On the contrary, the negative semantic matching structure indicates that if a particular semantic information of a particular word segment matches or has a higher matching rate with the negative semantic matching structure, it is less likely that initial answer information which corresponds to the semantic matching information including the negative semantic matching structure is the initial answer information of the particular semantic information.

In some embodiments, the computer equipment performs a search to multiple groups of semantic matching information in at least one of the plurality of sub-databases for matching the semantic information of each word segment, successively from high to low in priority of the sub-databases, till a group of semantic matching information matching the semantic information is found, and determines answer information corresponding to the group of semantic matching information to be the initial answer information.

In some embodiments, the computer equipment, first, performs following operations to each of the multiple groups of semantic matching information in the first sub-database having the highest priority among the plurality of sub-databases. To each semantic matching structure in one group of semantic matching information, the computer equipment performs a search to each word and/or semantic information of each word in the semantic matching structure for matching the semantic information of each word segment, and further determines a matching rate between the semantic information of each word segment and the semantic matching structure based on logic relations of words in the semantic matching structure. In this manner, the computer equipment determines a matching rate between the semantic information of each word segment and the one group of semantic matching information. As a result, the computer equipment can determine matching rates between the semantic information of each word segment and each group of semantic matching information, further determine a particular group of semantic matching information based on the matching rates, and obtains answer information corresponding to the particular group of semantic matching information as the initial answer information of the semantic information of the word segment.

It should be noted that, in some embodiments, the matching information may include both the semantic matching information and other matching information, such as sentences. The computer equipment performs a search to multiple groups of semantic matching information and other matching information in the predetermined knowledge database for matching the semantic information of each word segment, and determines initial answer information corresponding to a group of matching information matching the semantic information of the word segment to be the initial answer information of the semantic information of the word segment.

In some embodiments, in the above way 2), if the determined group of semantic matching information corresponds to one answer information, the one answer information may be determined to be the initial answer information directly. If the determined group of semantic matching information corresponds to a plurality of answer information, the computer equipment may select one answer information from the plurality of answer information as the initial answer information. There are many ways for the computer equipment to select the one answer information. In some embodiments, the computer equipment may select the one answer information randomly.

In some embodiments, the computer equipment may select the one answer information from the plurality of answer information based on equipment information of the user equipment and/or application information of an application which sends the text sequence to be processed.

In some embodiments, the equipment information of the user equipment may include any equipment information that can influence display of the answer information. In some embodiments, the equipment information of the user equipment may include types of the user equipment, such as mobile phone or television. In some embodiments, the equipment information of the user equipment may include information of a display format supported by the user equipment. In some embodiments, the equipment information of the user equipment may include current network information of the user equipment, such as mobile network or Wi-Fi.

In some embodiments, the application information of the application which sends the text sequence may include any information related to display of the answer information in the application. In some embodiments, the application information includes the name or a platform of the application, such as Microsoft Service Network (MSN), short message, microblog or WeChat. In some embodiments, the application information includes a code format supported by the application.

In some embodiments, the computer equipment may select, based on the equipment information of the user equipment and/or the application information of the application which sends the text sequence to be processed, one answer information applicable to the user equipment and/or the application from the plurality of answer information.

In some embodiments, the plurality of answer information includes plain text information and multi-media information with an extended label. If the user equipment is connected with Wi-Fi, the computer equipment may select the multi-media information with the extended label as the initial answer information. If the user equipment is connected with a mobile network, the computer equipment may select the plain text information as the initial answer information.

In some embodiments, the plurality of answer information includes executable information used in different platforms. If the application which sends the text sequence to be processed is microblog, the computer equipment may select the executable information used in microblog as the initial answer information.

It should be noted that, the above examples are described for better explaining solutions of the present disclosure, but should not limit the scope of the present disclosure. Those skilled in the art would understand that any methods for selecting one answer information from the plurality of answer information as the initial answer information based on the equipment information of the user equipment and/or the application information of the application which sends the text sequence to be processed fall into the scope of the present disclosure.

In some embodiments, in the above ways 1) and 2), if answer information, which has a higher matching rate with the semantic information of the word segment than a first threshold, is found in the search, the computer equipment determines the answer information to be the initial answer information, and, optionally, the current search process may be terminated. In some embodiments, if one or more answer information, which has a higher matching rate with the semantic information of the word segment than a second threshold and lower than the first threshold, is found when the search is completed, the computer equipment may provide description information of the one or more answer information to the user equipment, and determine answer information which is fed back from the user equipment and corresponds to a portion of the description information which is selected by the user equipment from the description information provided by the computer equipment to be the initial answer information. The first threshold is higher than the second threshold.

To the above way 1), matching information in the sub-database includes sentences and/or words, and multiple sentences and/or words constitute a group corresponding to one or more initial answer information. The computer equipment performs a search to the matching information in at least one of the plurality of sub-databases for matching the semantic information of each word segment, successively from high to low in priority of the sub-databases. If a group of sentences and/or words, which has a higher matching rate with the semantic information of the word segment than the first threshold, is found in the search, the computer equipment determines answer information corresponding to the group of sentences and/or words to be the initial answer information, and the current search process may be terminated. If a group of sentences and/or words, which has a higher matching rate with the semantic information of the word segment than the second threshold and lower than the first threshold, is found when the search is completed, the computer equipment may provide description information of one or more answer information which corresponds to the group of sentences and/or words to the user equipment, and determine answer information which is fed back from the user equipment and corresponds to a portion of the description information which is selected by the user equipment from the description information provided by the computer equipment to be the initial answer information.

To the above way 2), the computer equipment performs a search to multiple groups of semantic matching information in at least one of the plurality of sub-databases for matching the semantic information, successively from high to low in priority of the sub-databases. If semantic matching information, which has a higher matching rate with the semantic information than the first threshold, is found in the search, the computer equipment determines answer information corresponding to the semantic matching information to be the initial answer information, and, optionally, the current search process may be terminated. If one or more group of semantic matching information, which has a higher matching rate with the semantic information than the second threshold and lower than the first threshold, is found when the search is completed, the computer equipment may provide description information of one or more answer information which corresponds to the one or more group of semantic matching information to the user equipment, and determine answer information which is fed back from the user equipment and corresponds to a portion of the description information which is selected by the user equipment from the description information provided by the computer equipment to be the initial answer information.

In some embodiments, if the initial answer information has a relatively high matching rate with the answer information, the computer equipment may determine the initial answer information to be an established answer information, and the search is terminated to save resource consumption. If a plurality of answer information with a relatively passable matching rate are obtained, the initial answer information may be determined by inquiring the user, to ensure the initial answer information is the one the user expects.

In S4, the computer equipment provides an established answer information corresponding to the initial answer information to the user equipment.

In some embodiments, the initial answer information may be determined to be the established answer information. In some embodiments, the initial answer information is processed by the computer equipment to obtain the established answer information. In some embodiments, the established answer information may include but not limited to at least one of the following items.

1) plain text information, such as a passage of plain text description 2) plain multi-media information, such as voice or video.

3) multi-media information with an extended label, such as a text including a link, a video or a webpage.

4) executable information which can be executed by the user equipment. In some embodiments, the executable information includes functions and instructions.

In some embodiments, S4 may further include S41, S42 and S43.

In S41, if it is determined that the initial answer information cannot be directly provided to the user equipment, the computer equipment obtains parameter information from the semantic information of the word segment, where the parameter information is used to supplement the initial answer information.

The computer equipment may determine whether the initial answer information can be directly provided to the user equipment through many ways.

In some embodiments, each initial answer information may correspond to an identifier which indicates whether the initial answer information can be directly provided to the user equipment. In this manner, after obtaining the initial answer information, the computer equipment can determine whether the initial answer information can be directly provided to the user equipment based on the identifier corresponding to the initial answer information.

In some embodiments, the computer equipment may determine whether the initial answer information can be directly provided to the user equipment by determining whether the matching information corresponding to the initial answer information belongs to a predetermined type or whether the initial answer information belongs to the predetermined type. For example, if the initial answer information or its corresponding matching information belongs to a type of weather, the computer equipment may determine that the initial answer information cannot be directly provided to the user equipment.

In some embodiments, the computer equipment may determine whether the initial answer information can be directly provided to the user equipment by analyzing the initial answer information and determining whether the initial answer information includes a default item.

The computer equipment may obtain the parameter information from the semantic information of the word segment through many ways.

In some embodiments, the initial answer information which cannot be directly provided to the user equipment includes related information of its default item, such as an expression of the default item. The computer equipment may obtain the parameter information from the semantic information of the word segment based on the related information. For example, if the initial answer information obtained based on the text sequence "how is the weather today" defines a default item of the initial answer information to be a toponym or time, the computer equipment may search word segments of toponym type or time type among the semantic information of the word segment, and obtains parameter information of time from the semantic information of the word segment of time type "today".

It should be noted that, the above examples are described for better explaining solutions of the present disclosure, but should not limit the scope of the present disclosure. Those skilled in the art would understand that any methods for obtaining the parameter information from the semantic information of the word segment after it is determined that the initial answer information cannot be directly provided to the user equipment fall into the scope of the present disclosure.

In S42, the computer equipment processes the initial answer information based on the parameter information to obtain the established answer information.

In some embodiments, the computer equipment supplements the initial answer information based on the parameter information, and determines the supplemented initial answer information to be the established answer information. In some embodiments, the computer equipment executes the supplemented initial answer information to obtain an execution result, and determines the execution result to be the established answer information.

For example, if the initial answer information includes a plain text "you are in a X mood today", where X represents a default item of adjective, and the parameter information obtained in S41 is "good", the computer equipment may determine the supplemented initial answer information "you are in a good mood today" to be the established answer information and send it to the user equipment.

For another example, if the initial answer information includes executable information that includes a default item of time, and the parameter information obtained in S41 is "today", the computer equipment may obtain complete executable information after supplementing the initial answer information based on the parameter information, execute the executable information to obtain information corresponding to the parameter information "today" as the established answer information, and send the established answer information to the user equipment.

It should be noted that, the above examples are described for better explaining solutions of the present disclosure, but should not limit the scope of the present disclosure. Those skilled in the art would understand that any methods for obtaining the established answer information to be provided to the user equipment by processing the initial answer information based on any parameter information fall into the scope of the present disclosure.

In S43, the computer equipment provides the established answer information to the user equipment. If it is determined that the initial answer information can be directly provided to the user equipment, the computer equipment directly sends the initial answer information as the established answer information to the user equipment, so that the user equipment presents the established answer information to the user.

In above embodiments, the initial answer information is supplemented to obtain the established answer information based on parameters obtained from the text sequence which is acquired from the user, to make the established answer information to be provided to the user is adapted to the question the user raises.

In some embodiments, the method further includes S5, and S3 includes S31.

In S5, if the text sequence to be processed meets a predetermined trigger condition, the computer equipment obtains historical search information of the user equipment which provides the text sequence to be processed.

In some embodiments, the predetermined trigger condition may include any condition that can trigger the computer equipment to obtain the historical search information of the user equipment, such as the text sequence to be processed conforming to a predetermined format and/or a predetermined semantic.

In some embodiments, the historical search information of the user equipment may include but not limited to: a) historical word segments and/or historical semantic information obtained based on a historical text sequence from the user equipment; b) a historical text sequence, such as a text sequence to be processed from the user equipment which has been searched, where historical word segments and historical semantic information can be obtained by performing a process same as or similar to S2 to the historical text sequence.

In some embodiments, the computer equipment may recognize the user equipment through many ways. In some embodiments, the computer equipment may recognize the user equipment based on login information or registration information of the user. In some embodiments, the computer equipment may recognize the user equipment based on record information, such as cookie, in the user equipment. In some embodiments, the computer equipment may recognize the user equipment based on a phone number or a hardware identification code of the user equipment.

In S31, the computer equipment, by considering the historical search information of the user equipment, performs a search in at least one of the plurality of sub-databases for matching the semantic information, successively from high to low in priority of the sub-databases, till an initial answer information matching the semantic information is found.

In some embodiments, the computer equipment may perform S31 through many ways.

In some embodiments, the computer equipment may supplement the semantic information based on the historical search information. For example, if the historical search information includes a historical text sequence of the user, the computer equipment may supplement the current semantic information with semantic information of a word segment which is not included in the current text sequence but included in the historical text sequence. Afterwards, the computer equipment performs a search in at least one of the plurality of sub-databases for matching the supplemented semantic information, successively from high to low in priority of the sub-databases, till an initial answer information matching the supplemented semantic information is found.

In some embodiments, the historical search information of the user equipment may include historical semantic information obtained based on a historical text sequence from the user equipment. The computer equipment may supplement the semantic information of the word segments in the current text sequence based on the historical semantic information, and performs a search in at least one of the plurality of sub-databases for matching the supplemented semantic information, successively from high to low in priority of the sub-databases, till an initial answer information matching the supplemented semantic information is found. In some embodiments, the computer equipment may further determine whether the supplement to the semantic information can be performed based on the historical semantic information and the semantic information of the word segments in the current text sequence (called as current semantic information hereinafter).

In some embodiments, the computer equipment may determine whether there is similar semantic information (for example, synonyms, words belonging to a same class, or entities having similar structures) between the historical semantic information and the current semantic information. If it is determined that there is similar semantic information, the current semantic information may be implemented with semantic information that is included in the historical semantic information but not included in the current semantic information. And the search is performed in the predetermined knowledge database for matching the supplemented semantic information to determine the initial answer information. For example, the historical text sequence is "is it rainy in Shanghai", and the historical semantic information includes semantic information of word segments "in Shanghai", "rainy" and "is it". The current text sequence is "how is it in Beijing", and current semantic information of the current text sequence includes semantic information of word segments "in Beijing", "how" and "is it". The computer equipment determines that the semantic information of the word segments "in Shanghai" and "is it" is similar to the semantic information of the word segments "in Beijing" and "is it", and supplements the current semantic information with the semantic information of the word segment "rainy" which is included in the historical semantic information but not included in the current semantic information. Thus, the supplemented current semantic information includes the semantic information of the word segments "in Beijing", "rainy", "how" and "is it". In some embodiments, the computer equipment may further determine that there is similar semantic information between the historical semantic information and the current semantic information, and logic relations between the similar semantic information are also similar, before executing the above semantic supplementing operation.

It should be noted that, the embodiments of S31 may be combined with the embodiments of S3.

In the above embodiments, the current text sequence is supplemented based on historical search of the user, so that the semantic information can be supplemented and understood automatically in case the text sequence acquired from the user is not completed. Besides, by limiting a trigger condition of acquiring historical search information, the computer equipment is activated to supplement the text sequence only in appropriate situations, which can avoid or reduce the possibility of crash of the computer equipment caused by continuous search to the historical search information.

Figure 2:
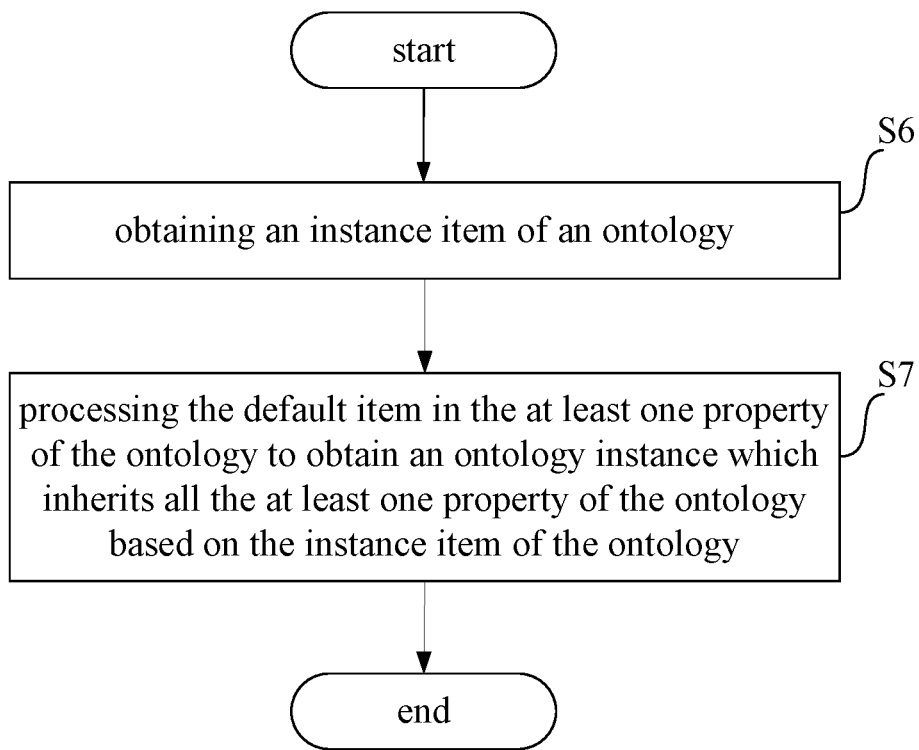
FIG. 2 schematically illustrates a flow chart of a method for creating an ontology instance according to an embodiment of the present disclosure.

FIG. 2 schematically illustrates a flow chart of a method for creating an ontology instance according to an embodiment of the disclosure. The method includes S6 and S7. In some embodiments, a sub-database in a predetermined knowledge database includes at least one ontology instance. Each of at least one property of each ontology instance includes one group of semantic matching information and initial answer information corresponding to the group of semantic matching information. In some embodiments, the ontology instance may include a plurality of properties, and each property may further include other information, such as a standard question or a property type.

In S6, a computer equipment obtains an instance item of an ontology. The ontology has at least one property, and each of the at least one property includes ontology answer information and one group of semantic matching information with a default item. In some embodiments, the ontology answer information may also include a default item.

The instance item of the ontology represents a detailed instance of a default item of the ontology. For example, a group of semantic matching information in the ontology includes a default item XX, such as "[XX] fee", thus, the instance item of the ontology as a detailed instance of the default item XX may be, for example, "3G".

The computer equipment may obtain the instance item of the ontology through many ways. For example, the instance item may be input manually or may be pre-stored.

In S7, the computer equipment processes the default item in the at least one property of the ontology to obtain an ontology instance which inherits all the at least one property of the ontology based on the instance item of the ontology.

In some embodiments, each property of the ontology includes ontology answer information and a group of semantic matching information. For example, the group of semantic matching information includes following semantic matching structures with a default item: "[XXX][charging fee| paying fee| accounting fee][method]", "[XXX][how much]", "[XXX][charging fee| paying fee| fee| deducting fee| handing in fee| accounting fee][standard| situation]" and a sentence "is XXX expensive", and the instance item of the ontology is "EasyOwn". The computer equipment supplements the default items included in the at least one property of the ontology with the instance item of the ontology, to obtain the ontology instance which inherits all the at least one property of the ontology, such as inheriting all the semantic matching information of the ontology. The property of the ontology instance includes the ontology answer information as an initial answer information and a group of semantic matching information, the group of semantic matching information includes following semantic matching structures with a default item: "[EasyOwn][charging fee| paying fee| accounting fee][method]", "[EasyOwn][how much]", "[EasyOwn][charging fee| paying fee| fee| deducting fee| handing in fee| accounting fee][standard| situation]" and a sentence "is EasyOwn expensive".

In some embodiments, if the ontology answer information includes a default item, the computer equipment may further process the default item in the ontology answer information to obtain the initial answer information based on the instance item of the ontology.

In some embodiments, if a first ontology is a sub-ontology of a second ontology, the first ontology may inherit all the properties of the second ontology. The inheriting way is similar to S6 and S7, and not described in detail here.

In some embodiments, if a large amount of ontology instances have similar properties, it is unnecessary to create properties for each ontology instance repeatedly. By inheriting all the properties of the ontology, the large amount of ontology instances can be created simply, which may greatly reduce resource consumption in the creating process of ontology instances.

Figure 3:
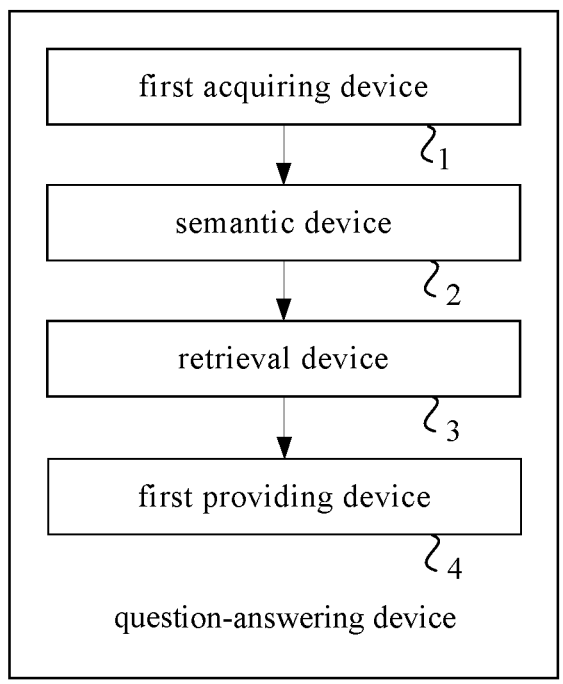
FIG. 3 schematically illustrates a structural diagram of a question-answering device for acquiring answer information according to an embodiment of the present disclosure.

FIG. 3 schematically illustrates a structural diagram of a question-answering device for acquiring answer information according to an embodiment of the disclosure. The question-answering device may be equipped in a computer equipment, and includes a first acquiring device 1, a semantic device 2, a retrieval device 3 and a first providing device 4.

The first acquiring device 1 acquires a text sequence to be processed from a user equipment.

In some embodiments, the text sequence to be processed may be input directly by a user, or a text sequence obtained by recognizing a speech input by a user.

For example, the user inputs a text sequence "how is the weather today", and presses a send button to instruct the user equipment to send the text sequence to the computer equipment. The text sequence "how is the weather today" is the text sequence to be processed from the user equipment.

For another example, after the user inputs a speech in an application, the speech is sent to the computer equipment via internet by the application, and the computer equipment may recognize the speech to acquire a text sequence "how is the weather today". The text sequence "how is the weather today" is the text sequence to be processed from the user equipment.

It should be noted that, the above examples are described for better explaining solutions of the present disclosure, but should not limit the scope of the present disclosure. Those skilled in the art would understand that any ways for acquiring the text sequence to be processed from the user equipment fall into the scope of the present disclosure.

Afterwards, the semantic device 2 divides the text sequence into a plurality of word segments and obtains semantic information of at least one of the plurality of word segments.

In some embodiments, semantic information of a word segment includes information which can represent semantic of the word segment and can be recognized by the computer equipment. In some embodiments, the semantic information of the word segment includes but not limited to at least one of the followings.

1) A synonym of the word segment and/or a combination of synonyms of the word segment For example, the semantic information of the word segment "weather" includes its synonym, such as "climate".

2) A word that belongs to a same class with the word segment and/or a combination of words that belong to the same class with the word segment The same class represents all the words belong to a same class with the word segment. In some embodiments, if the word segment is a toponym, the word belonging to the same class with the word segment may include other toponyms. For example, the semantic information of the word segment "Shanghai" may include, such as "Beijing" or "Tianjin".

3) An entity having a same or similar structure with the word segment

The entity having the same or similar structure with the word segment means the entity having an information structure same as or similar to the information structure of the word segment. In some embodiments, the entity may be a special semantic expression.

For example, if the word segment is a specific time structure "ten forty-five on Jan. 1, 2013", the entity having the same or similar structure with the word segment may be a semantic expression of date "XXX clock XXX minutes on XXX date of XXX month in XXX year". This kind of special semantic expression may further include a personal name, an address or a phone number.

It should be noted that, the above examples are described for better explaining solutions of the present disclosure, but should not limit the scope of the present disclosure. Those skilled in the art would understand that any information representing semantic of a word segment which can be recognized by a computer fall into the scope of the present disclosure.

There are a plurality of ways for the semantic device 2 to divide the text sequence to be processed into the plurality of word segments and obtain the semantic information of at least one of the plurality of word segments.

In some embodiments, the semantic device 2 may divide the text sequence to be processed into a plurality of word segments in many ways, and match a particular word segment among the plurality of word segment with a word which corresponds to a semantic information obtained in advance, and determine the semantic information of the word to be the semantic information of the particular word segment, if the word successfully matches the particular word segment.

In some embodiments, after the word which successfully matches the particular word segment is determined, the semantic information of the word is further processed based on context of the particular word segment in the text sequence to be processed, to determine the accurate semantic information of the particular word segment.

In some embodiments, the semantic device 2 may obtain the semantic information of each of the plurality of word segments, or the semantic information of a portion of the plurality of word segments. For example, the computer equipment may not obtain semantic information of those meaningless word segments.

It should be noted that, the above examples are described for better explaining solutions of the present disclosure, but should not limit the scope of the present disclosure. Those skilled in the art would understand that any methods for dividing the text sequence to be processed into the plurality of word segments and obtaining semantic information of at least one of the plurality of word segments fall into the scope of the present disclosure.

The retrieval device 3 performs a search in at least one of the plurality of sub-databases for matching the semantic information, successively from high to low in priority of the sub-databases, till an initial answer information matching the semantic information is found.

In some embodiments, the plurality of sub-databases include matching information which are used to match the semantic information of the word segments and correspond to initial answer information. Therefore, the retrieval device 3 may perform the search to the matching information for matching the semantic information of the word segments, to determine the initial answer information corresponding to the semantic information of each word segment. In some embodiments, the matching information may be affirmative or negative. The affirmative matching information indicates that if a particular semantic information of a particular word segment matches or has a higher matching rate with the affirmative matching information, it is more likely that initial answer information which corresponds to the affirmative matching information is the initial answer information of the particular semantic information. On the contrary, the negative matching information indicates that if a particular semantic information of a particular word segment matches or has a higher matching rate with the negative matching information, it is less likely that initial answer information which corresponds to the negative matching information is the initial answer information of the particular semantic information.

In some embodiments, the initial answer information may include but not limited to following information.
1) answer information which can be provided to the user directly, where the answer information may be complete and presented to the user directly or after being executed by the user equipment.
This kind of answer information includes, for example, a plain text, plain multi-media information, multi-media information with an extended label or executable information. The extended label is optional to the user (by a click of the user) and is linked to other information. The executable information includes any information that is capable of being executed by the user equipment, such as functions or instructions.
2) answer information which cannot be provided to the user directly, where the answer information may be incomplete, and before being presented to the user, the answer information needs to be supplemented, or needs to be supplemented and operated by the user equipment.
This kind of answer information includes, for example, a plain text with a default item, plain multi-media information with a default item, multi-media information with a default extended label or executable information with a default parameter.

It should be noted that, the above examples are described for better explaining solutions of the present disclosure, but should not limit the scope of the present disclosure. Those skilled in the art would understand that any answer information which can be obtained by semantic matching falls into the scope of the present disclosure.

In some embodiments, the priority order of the plurality of sub-databases may be predetermined, or may be determined, by a first determining device (not shown in Figures) in the question-answering device, based on the semantic information through many methods. In some embodiments, the first determining device may determine the priority of the sub-databases used by the retrieval device 3 based on category of the word segments in combination with predetermined priority orders of the sub-databases under different categories of sub-databases. In some embodiments, the first determining device may adjust the predetermined priority orders of the sub-databases based on whether the semantic information includes an entity conforming to a specific structure, so as to obtain the priority order of the sub-databases used by the retrieval device 3. Therefore, according to different semantics, the priority order of the sub-databases may be adjusted to be more suitable for practical semantic situations.

In some embodiments, the retrieval device 3 may first perform a search in a first sub-database having the highest priority among the plurality of sub-databases. If the initial answer information is found in the first sub-database, the computer equipment may terminate the search process; or if the initial answer information cannot be found in the first sub-database, the computer equipment may perform a search in one or more second sub-database having the second highest among the plurality of sub-databases. And so on, till the computer equipment obtains the initial answer information.

In some embodiments, ways for the retrieval device 3, for realizing to perform the search in at least one of the plurality of sub-databases for matching the semantic information, successively from high to low in priority order of the plurality of sub bases, till the initial answer information matching the semantic information is found may include but not limited to:
1) matching information in the sub-database includes sentences and/or words, and multiple sentences and/or words constitute a group which may correspond to one or more initial answer information. The retrieval device 3 performs a search to the matching information in at least one of the plurality of sub-databases for matching the semantic information of each word, successively from high to low in priority of the sub-databases, till the initial answer information corresponding to the semantic information of each word segment is determined.

For example, the semantic device 2 obtains two word segments "a ten-yuan local data traffic package" and "how is", and the semantic information of the two word segments from the text sequence "how is a ten-yuan local data traffic package". The retrieval device 3, first, performs a search to matching information in a first sub-database which has the highest priority among the plurality of sub bases for matching the semantic information of the two word segments, but fails to find the matching information matching the semantic information of the two word segments. Afterwards, the retrieval device 3 performs a search to matching information in a second sub-database having the second highest priority among the plurality of sub-databases for matching the semantic information of the two word segments, and determines that the semantic information of the two word segments matches a group of matching information consisting of three sentences "what service does a ten-yuan local data traffic package provide", and "excuse me, do you know a ten-yuan local data traffic package" and "what service can a ten-yuan local data traffic package provide to me". Thus, the retrieval device 3 determines a plain text information of "a ten-yuan local data traffic package is a special offer of data traffic for XX user, and you only need to pay 10-yuan monthly fee to enjoy the special offer" corresponding to the group of matching information to be the initial answer information corresponding to the semantic information of the two word segments of "a ten-yuan local data traffic package" and "how is".
2) The retrieval device 3 includes a first sub-retrieval device (not shown in Figures). The first sub-retrieval device performs a search to multiple groups of semantic matching information in at least one of the plurality of sub-databases for matching the semantic information, successively from high to low in priority of the sub-databases, till a group of semantic matching information matching the obtained semantic information is found, and determines answer information corresponding to the group of semantic matching information to be the initial answer information.

Each group of semantic matching information includes at least one semantic matching structure. A semantic matching structure can be represented by a semantic expression.

In some embodiments, the semantic matching structure may include but not limited to at least one of the followings: a) a plurality of words and semantic information of at least one of the plurality of words, where semantic information of a word is similar to semantic information of a word segment and not described in detail here; b) logic relations between the plurality of words, such as the sequencing of the plurality of words or restrictive relations of the plurality of words (for example, one word is a qualifier of another word).

For example, a group of semantic matching information includes three semantic matching structures "[data related?][the types of rain][about][weather region name][has or doesn't has][influence]", "[weather region name][weather related][or][the types of rain]" and "[search?][weather region name][date related| @time?][does or does not][need| can?][take an umbrella]", where "|" represents logic OR, and content in each bracket "[ ]" represents a word and/or semantic information of the word. For example, "take an umbrella" is a word, and "weather region name" is a special expression representing a word of regions.

In some embodiments, a standard question may be used to represent natural language meaning which is close in meaning to all the semantic matching information in a group of semantic matching information. The standard question may be included in the predetermined knowledge database, so that an operation person can understand the semantic of the group of semantic matching information. For example, the standard question for the above group of semantic matching information including the three semantic matching structures may be "will it rain today?"

In some embodiments, each group of semantic matching information may further include the type of each semantic matching structure. The type of a semantic matching structure indicates whether the semantic matching structure is affirmative or negative. The affirmative semantic matching structure indicates that if a particular semantic information of a particular word segment matches or has a higher matching rate with the affirmative semantic matching structure, it is more likely that initial answer information which corresponds to the semantic matching information including the affirmative semantic matching structure is the initial answer information of the semantic information of the word segment. On the contrary, the negative semantic matching structure indicates that if a particular semantic information of a particular word segment matches or has a higher matching rate with the negative semantic matching structure, it is less likely that initial answer information which corresponds to the semantic matching information including the negative semantic matching structure is the initial answer information of the semantic information.

In some embodiments, the first sub-retrieval device performs a search to multiple groups of semantic matching information in at least one of the plurality of sub-databases for matching the semantic information of each word segment, successively from high to low in priority of the sub-databases, till a group of semantic matching information matching the obtained semantic information is found, and determines answer information corresponding to the group of semantic matching information to be the initial answer information.

In some embodiments, the first sub-retrieval device, first, performs following operations to each of multiple groups of semantic matching information in the first sub-database having the highest priority among the plurality of sub-databases. To each semantic matching structure in each group of semantic matching information, the first sub-retrieval device performs a search to each word and/or semantic information of each word in the semantic matching structure for matching the semantic information of each word segment, and further determines a matching rate between the semantic information of each word segment and the semantic matching structure based on logic relations of words in the semantic matching structure. In this manner, the first sub-retrieval device determines a matching rate between the semantic information of each word segment and the corresponding group of semantic matching information. As a result, the first sub-retrieval device can determine matching rates between the semantic information of each word segment and each group of semantic matching information, further determine a particular group of semantic matching information based on the matching rates, and obtains answer information corresponding to the particular group of semantic matching information as the initial answer information of the semantic information of the word segment.

It should be noted that, in some embodiments, the matching information may include both the semantic matching information and other matching information, such as sentences. The first sub-retrieval device performs a search to multiple groups of semantic matching information and other matching information in the predetermined knowledge database for matching the semantic information of each word segment, and determines initial answer information corresponding to a group of matching information matching the semantic information of the word segment to be the initial answer information of the semantic information of the word segment.

In some embodiments, the first sub-retrieval device includes a second sub-retrieval device (not shown in Figures) and a selecting device (not shown in Figures). If the determined group of semantic matching information corresponds to one answer information, the one answer information may be determined to be the initial answer information directly. If the determined group of semantic matching information corresponds to a plurality of answer information, the computer equipment may select one answer information from the plurality of answer information as the initial answer information. There are many ways for the first sub-retrieval device to select the one answer information. In some embodiments, the first sub-retrieval device may select the one answer information randomly.

In some embodiments, the first sub-retrieval device includes a second sub-retrieval device (not shown in Figures) and a selecting device (not shown in Figures). The second sub-retrieval device performs a search to the multiple groups of semantic matching information in at least one of the plurality of sub-databases for matching the semantic information, successively from high to low in priority of the sub-databases, till a group of semantic matching information matching the semantic information is found. The selecting device may select the one answer information from the plurality of answer information based on equipment information of the user equipment and/or application information of an application which sends the text sequence to be processed.

In some embodiments, the equipment information of the user equipment may include any equipment information that can influence display of the answer information. In some embodiments, the equipment information of the user equipment may include types of the user equipment, such as mobile phone or television. In some embodiments, the equipment information of the user equipment may include information of a display format supported by the user equipment. In some embodiments, the equipment information of the user equipment may include information of a current network of the user equipment, such as mobile network or Wi-Fi.

In some embodiments, the application information of the application which sends the text sequence may include any information related to display of the answer information in the application. In some embodiments, the application information includes the name or a platform of the application, such as MSN, short message, microblog or WeChat. In some embodiments, the application information includes a code format supported by the application.

In some embodiments, the selecting device may select one answer information applicable to the user equipment and/or the application from the plurality of answer information based on the equipment information of the user equipment and/or the application information of the application which sends the text sequence to be processed.

In some embodiments, the plurality of answer information includes plain text information and multi-media information with an extended label. If the user equipment is connected with Wi-Fi, the selecting device may select the multi-media information with the extended label as the initial answer information. If the user equipment is connected with a mobile network, the selecting device may select the plain text information as the initial answer information.

In some embodiments, the plurality of answer information includes executable information used in different platforms. If the application which sends the text sequence to be processed is microblog, the selecting device may select the executable information used in microblog as the initial answer information.

It should be noted that, the above examples are described for better explaining solutions of the present disclosure, but should not limit the scope of the present disclosure. Those skilled in the art would understand that any methods for selecting one answer information from the plurality of answer information as the initial answer information based on the equipment information of the user equipment and/or the application information of the application which sends the text sequence to be processed fall into the scope of the present disclosure.

In some embodiments, the retrieval device 3 may further include a second determining device (not shown in Figures), a second providing device (not shown in Figures) and a third determining device (not shown in Figures). In the above ways 1) and 2), if answer information, which has a higher matching rate with the semantic information of the word segment than a first threshold, is found in the search, the second determining device determines the answer information to be the initial answer information, and, optionally, the current search process may be terminated. In some embodiments, if one or more answer information, which has a higher matching rate with the semantic information of the word segment than a second threshold and lower than the first threshold, is found when the search is completed, the second determining device may provide description information of the one or more answer information to the user equipment, and the third determining device determines answer information which is fed back from the user equipment and corresponds to a portion of the description information which is selected by the user equipment from the description information provided by the second determining device to be the initial answer information. The first threshold is higher than the second threshold.

To the above way 1), matching information in the sub-database includes sentences and/or words, and multiple sentences and/or words constitute a group corresponding to one or more initial answer information. The retrieval device 3 performs a search to the matching information in at least one of the plurality of sub-databases for matching the semantic information of each word segment, successively from high to low in priority of the sub-databases. If a group of sentences and/or words, which has a higher matching rate with the semantic information of the word segment than the first threshold, is found in the search, the second determining device determines answer information corresponding to the group of sentences and/or words to be the initial answer information, and, optionally, the current search process may be terminated. If a group of sentences and/or words, which has a higher matching rate with the semantic information of the word segment than the second threshold and lower than the first threshold, is found when the search is completed, the second providing device may provide description information of one or more answer information which corresponds to the group of sentences and/or words to the user equipment, and the third determining device determines answer information which is fed back from the user equipment and corresponds to a portion of the description information which is selected by the user equipment from the description information provided by the second providing device to be the initial answer information.

To the above way 2), the retrieval device 3 performs a search to multiple groups of semantic matching information in at least one of the plurality of sub-databases for matching the semantic information, successively from high to low in priority of the sub-databases. If semantic matching information, which has a higher matching rate with the semantic information of the word segment than the first threshold, is found in the search, the second determining device determines answer information corresponding to the semantic matching information to be the initial answer information, and, optionally, the current search process may be terminated. If one or more group of semantic matching information, which has a higher matching rate with the semantic information than the second threshold and lower than the first threshold, is found when the search is completed, the second providing device may provide description information of one or more answer information which corresponds to the one or more group of semantic matching information to the user equipment, and the third determining device determines answer information which is fed back from the user equipment and corresponds to a portion of the description information which is selected by the user equipment from the description information provided by the second providing device to be the initial answer information.

In some embodiments, if the initial answer information has a relatively high matching rate with the answer information, the initial answer information may be determined to be an established answer information, and the search is terminated to save resource consumption. If a plurality of answer information with a relatively passable matching rate are obtained, the initial answer information may be determined by inquiring the user, to ensure the initial answer information is the one the user expects.

The first providing device 4 provides an established answer information corresponding to the initial answer information to the user equipment.

In some embodiments, the initial answer information may be taken as the established answer information. In some embodiments, the first providing device 4 processes the initial answer information to obtain the established answer information. In some embodiments, the established answer information may include but not limited to at least one of the following items.

1) plain text information, such as a passage of plain text description
2) plain multi-media information, such as voice or video.
3) multi-media information with an extended label, such as a text including a link, a video or a webpage.
4) executable information which can be executed by the user equipment. In some embodiments, the executable information includes functions and instructions.

In some embodiments, the first providing device 4 may further include a third acquiring device (not shown in Figures), a fourth acquiring device (not shown in Figures) and a third providing device (not shown in Figures).

If it is determined that the initial answer information cannot be directly provided to the user equipment, the third acquiring device obtains parameter information from the semantic information of the word segment, the parameter information being used to supplement the initial answer information.

The third acquiring device may determine whether the initial answer information can be directly provided to the user equipment through many ways.

In some embodiments, each initial answer information may correspond to an identifier which indicates whether the initial answer information can be directly provided to the user equipment. In this manner, after obtaining the initial answer information, the third acquiring device can determine whether the initial answer information can be directly provided to the user equipment based on the identifier corresponding to the initial answer information.

In some embodiments, the third acquiring device may determine whether the initial answer information can be directly provided to the user equipment by determining whether the matching information corresponding to the initial answer information belongs to a predetermined type or whether the initial answer information belongs to the predetermined type. For example, if the initial answer information or its corresponding matching information belongs to a type of weather, the third acquiring device may determine that the initial answer information cannot be directly provided to the user equipment.

In some embodiments, the third acquiring device may determine whether the initial answer information can be directly provided to the user equipment by analyzing the initial answer information and determining whether the initial answer information includes a default item.

The third acquiring device may obtain the parameter information from the semantic information of the word segment through many ways.

In some embodiments, the initial answer information which cannot be directly provided to the user equipment includes related information of its default item, such as an expression of the default item. The third acquiring device may obtain the parameter information from the semantic information of the word segment based on the related information. For example, if the initial answer information obtained based on the text sequence "how is the weather today" defines a default item of the initial answer information to be a toponym or time, the third acquiring device may search word segments of toponym type or time type among the semantic information of the word segment, and obtains parameter information of time from the semantic information of the word segment of time type "today".

It should be noted that, the above examples are described for better explaining solutions of the present disclosure, but should not limit the scope of the present disclosure. Those skilled in the art would understand that any methods for obtaining the parameter information from the semantic information of the word segment after it is determined that the initial answer information cannot be directly provided to the user equipment fall into the scope of the present disclosure.

The fourth acquiring device processes the initial answer information based on the parameter information to obtain the established answer information.

In some embodiments, the fourth acquiring device supplements the initial answer information based on the parameter information, and determines the supplemented initial answer information to be the established answer information. In some embodiments, the fourth acquiring device executes the supplemented initial answer information to obtain an execution result, and determines the execution result to be the established answer information.

For example, if the initial answer information includes a plain text "you are in a X mood today", where X represents a default item of adjective, and the parameter information obtained by the third acquiring device is "good", the fourth acquiring device may determine the supplemented initial answer information "you are in a good mood today" to be the established answer information and sends it to the user equipment.

For another example, if the initial answer information includes executable information that includes a default item of time, and the parameter information obtained by the third acquiring device is "today", the fourth acquiring device may obtain completed executable information after supplementing the initial answer information based on the parameter information, and execute the executable information to obtain information corresponding to the parameter information "today" as the established answer information.

It should be noted that, the above examples are described for better explaining solutions of the present disclosure, but should not limit the scope of the present disclosure. Those skilled in the art would understand that any methods for obtaining the established answer information to be provided to the user equipment by processing the initial answer information based on any parameter information fall into the scope of the present disclosure.

The third providing device provides the established answer information to the user equipment. If it is determined that the initial answer information can be directly provided to the user equipment, the first providing device 4 sends the initial answer information as the established answer information to the user equipment, so that the user equipment can present the established answer information to the user.

In above embodiments, the initial answer information is supplemented to obtain the established answer information based on parameters obtained from the text sequence which is acquired from the user, to make the established answer information to be provided to the user is adapted to the question the user raises.

In some embodiments, the question-answering device further includes a fifth acquiring device (not shown in Figures), and the third retrieval device 3 includes a third sub-retrieval device (not shown in Figures).

If the text sequence to be processed meets a predetermined trigger condition, the fifth acquiring device obtains historical search information of the user equipment which provides the text sequence to be processed.

In some embodiments, the predetermined trigger condition may include any condition that can trigger the computer equipment to obtain the historical search information of the user equipment, such as the text sequence to be processed conforming to a predetermined format and/or a predetermined semantic.

In some embodiments, the historical search information of the user equipment may include but not limited to: a) historical word segments and/or historical semantic information obtained based on a historical text sequence from the user equipment; b) a historical text sequence from the user equipment, for example, a text sequence to be processed from the user equipment which has been searched before, where historical word segments and historical semantic information were obtained by performing a process which is same as or similar to that executed by the semantic device 2 to the historical text sequence.

In some embodiments, the question-answering device may recognize the user equipment through many ways. In some embodiments, the question-answering device may recognize the user equipment based on login information or registration information of the user. In some embodiments, the question-answering device may recognize the user equipment based on record information, such as cookie, in the user equipment. In some embodiments, the question-answering device may recognize the user equipment based on a phone number or a hardware identification code of the user equipment.

The third sub-retrieval device, by considering the historical search information of the user equipment, performs a search in at least one of the plurality of sub-databases for matching the semantic information, successively from high to low in priority of the sub-databases, till an initial answer information matching the semantic information is found.

In some embodiments, the third sub-retrieval device may perform the above process through many ways.

In some embodiments, the third sub-retrieval device may supplement the semantic information based on the historical search information. For example, if the historical search information includes a historical text sequence of the user, the third sub-retrieval device may supplement the current semantic information with semantic information of a word segment which is not included in the current text sequence but included in the historical text sequence. Afterwards, the third sub-retrieval device performs a search in at least one of the plurality of sub-databases for matching the supplemented semantic information, successively from high to low in priority of the sub-databases, till an initial answer information matching the supplemented semantic information is found.

In some embodiments, the historical search information of the user equipment may include historical semantic information obtained based on a historical text sequence from the user equipment. The third sub-retrieval device may supplement semantic information of word segments in the current text sequence based on the historical semantic information, and performs a search in at least one of the plurality of sub-databases for matching the supplemented semantic information, successively from high to low in priority of the sub-databases, till an initial answer information matching the supplemented semantic information is found. In some embodiments, the third sub-retrieval device may further determine whether the supplement to the semantic information can be performed based on the historical semantic information and the semantic information of the word segments in the current text sequence (called as current semantic information hereinafter).

In some embodiments, the third sub-retrieval device may determine whether there is similar semantic information (for example, synonyms, words belonging to a same class, or entities having similar structures) between the historical semantic information and the current semantic information. If it is determined that there is similar semantic information, the current semantic information may be implemented with semantic information that is included in the historical semantic information but not included in the current semantic information. And the search is performed in the predetermined knowledge database for matching the supplemented semantic information to determine the initial answer information. For example, the historical text sequence is "is it rainy in Shanghai", and the historical semantic information includes semantic information of word segments "in Shanghai", "rainy" and "is it". The current text sequence is "how is it in Beijing", and current semantic information of the current text sequence includes semantic information of word segments "in Beijing", "how" and "is it". The third sub-retrieval device determines that the semantic information of the word segments "in Shanghai" and "is it" is similar to the semantic information of the word segments "in Beijing" and "is it", and supplements the current semantic information with the semantic information of the word segment "rainy" which is included in the historical semantic information but not included in the current semantic information. Thus, the supplemented current semantic information includes the semantic information of the word segments "in Beijing", "rainy", "how" and "is it". In some embodiments, before executing the above semantic supplementing operation, the third sub-retrieval device may further determine that there is similar semantic information between the historical semantic information and the current semantic information, and logic relations between the similar semantic information are also similar.

It should be noted that, the embodiments of the third sub-retrieval device may be combined with the embodiments of the retrieval device 3.

In the above embodiments, the current text sequence is supplemented based on historical search of the user, so that the semantic information can be supplemented and understood automatically in case the text sequence acquired from the user is not completed. Besides, by limiting a trigger condition of acquiring historical search information, the computer equipment is activated to supplement the text sequence only in appropriate situations, which can avoid or reduce the possibility of crash of the computer equipment caused by continuous search to the historical search information.

Figure 4:
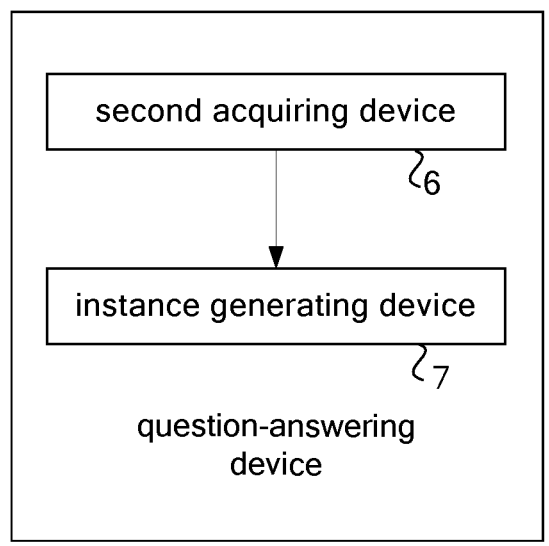
FIG. 4 schematically illustrates a structural diagram of a question-answering device for creating an ontology instance according to an embodiment of the present disclosure.

FIG. 4 schematically illustrates a structural diagram of a question-answering device for creating an ontology instance according to an embodiment of the disclosure. The question-answering device may be equipped in the computer equipment, and includes a second acquiring device 6 and an instance generating device 7. In some embodiments, a sub-database in a predetermined knowledge database includes at least one ontology instance. Each of at least one property of each ontology instance includes one group of semantic matching information and initial answer information corresponding to the group of semantic matching information. In some embodiments, the ontology instance may include a plurality of properties, and each property may further include other information, such as a standard question or a property type.

The second acquiring device 6 obtains an instance item of an ontology. The ontology has at least one property, and each of the at least one property includes ontology answer information and one group of semantic matching information with a default item. In some embodiments, the ontology answer information may also include a default item.

The instance item of the ontology represents a detailed instance of a default item of the ontology. For example, a group of semantic matching information in the ontology includes a default item XX, such as "[XX] fee", the instance item of the ontology as a detailed instance of the default item XX may be, for example, "3G".

The second acquiring device 6 may obtain the instance item of the ontology through many ways. For example, the instance item may be input manually or may be pre-stored.

The instance generating device 7 processes the default item in the at least one property of the ontology to obtain an ontology instance which inherits all the at least one property of the ontology based on the instance item of the ontology.

In some embodiments, each property of the ontology includes ontology answer information and a group of semantic matching information. For example, the group of semantic matching information includes following semantic matching structures with a default item: "[XXX][charging fee| paying fee| accounting fee][method]", "[XXX][how much]", "[XXX][charging fee| paying fee| fee| deducting fee| handing in fee| accounting fee][standard| situation]" and a sentence "is XXX expensive", and the instance item of the ontology is "EasyOwn". The instance generating device 7 supplements the default items included in the at least one property of the ontology with the instance item of the ontology, to obtain the ontology instance which inherits all the at least one property of the ontology, such as inheriting all the semantic matching information of the ontology. The property of the ontology instance includes the ontology answer information as initial answer information and a group of semantic matching information, the group of semantic matching information includes following semantic matching structures with a default item: "[EasyOwn][charging fee| paying fee| accounting fee][method]", "[EasyOwn][how much]", "[EasyOwn][charging fee| paying fee| fee| deducting fee| handing in fee| accounting fee][standard| situation]" and a sentence "is EasyOwn expensive".

In some embodiments, if the ontology answer information includes a default item, the instance generating device 7 may further process the default item in the ontology answer information to obtain the initial answer information based on the instance item of the ontology.

In some embodiments, if a first ontology is a sub-ontology of a second ontology, the first ontology may inherit all the properties of the second ontology. The inheriting way is similar to the operation of the second acquiring device 6 and the instance generating device 7, and not described in detail here.

In some embodiments, if a large amount of ontology instances have similar properties, it is unnecessary to create properties for each ontology instance repeatedly. By inheriting all the properties of the ontology, the large amount of ontology instances can be created simply, which may reduce resource consumption in the creating process of ontology instances.

It should be noted that, the embodiments of the present disclosure may be implemented in software and/or a combination of software and hardware. For example, each devices in the embodiments of the present disclosure may be realized by using Application Specific Integrated Circuit (ASIC) or any other similar hardware. In some embodiments, software programs of the embodiments of the present disclosure may be implemented by a processor to realize the processes or functions described in the above descriptions. The software programs (including related data structure) of the embodiments of the present disclosure may be stored into a computer readable record medium, such as a Random Access Memory (RAM), a magnetic or optical driver, a soft magnetic disk or other similar devices. Besides, processes or functions described in the embodiments of the present disclosure may be realized by hardware, such as a circuit which cooperates with the processor to execute the processes or functions.

To those skilled in the art, it is apparent that the present disclosure is not limited to the details of the above exemplary embodiments, and the present disclosure may be implemented with other embodiments without departing from the spirit or basic features of the present disclosure. Thus, in any way, the embodiments should be regarded as exemplary, not limitative; the scope of the present disclosure is limited by the appended claims, instead of the above depictions. Thus, all variations intended to fall into the meaning and scope of equivalent elements of the claims should be covered within the present disclosure. No reference signs in the claims should be regarded as limiting the involved claims. Besides, it is apparent that the term "comprise" does not exclude other pans, units or steps, and singularity does not exclude plurality. A plurality of parts, units or modules depicted in a system claim may also be implemented by a single part, unit or module through software or hardware. Besides, words like "first" or "second" are used to represent names, but not to represent a specific order.

What is claimed is:

1. A method for acquiring answer information based on a predetermined knowledge database in a computer equipment, wherein the predetermined knowledge database comprises a plurality of sub-databases, and the method comprises:
    a) acquiring a text sequence to be processed from a user equipment;
    b) dividing the text sequence into a plurality of word segments and obtaining semantic information of at least one of the plurality of word segments;
    c) performing a search in at least one of the plurality of sub-databases for matching the semantic information, successively from high to low in priority of the plurality of sub-databases, till an initial answer information matching the semantic information is found; and
    d) providing an established answer information corresponding to the initial answer information to the user equipment,
    wherein the step c) comprises:
        if answer information, which has a higher matching rate with the semantic information of the word segment than a first threshold, is found in the search, determining the answer information to be the initial answer information; or
        if one or more answer information, which has a higher matching rate with the semantic information of the word segment than a second threshold and lower than the first threshold, is found when the search is completed, providing description information of the one or more answer information to the user equipment and determining answer information which is fed back from the user equipment and corresponds to a portion of the description information which is selected by the user equipment to be the initial answer information.

2. The method according to claim 1, prior to the step c), further comprising:
determining the priority order of the plurality of sub-databases based on the semantic information.

3. The method according to claim 1, wherein the step c) comprises:
c1) performing the search to multiple groups of semantic matching information in at least one of the plurality of sub-databases for matching the semantic information, successively from high to low in priority of the plurality of sub bases, till a group of semantic matching information matching the semantic information is found; and
determining answer information corresponding to the group of semantic matching information to be the initial answer information, wherein each of the multiple groups of semantic matching information comprises one or more semantic matching structure.

4. The method according to claim 3, wherein the semantic matching structure comprises at least one of the following items:
a plurality of words and semantic information of at least one of the plurality of words; and
logic relations between the plurality of words.

5. The method according to claim 3, wherein the step c1) comprises:
if the group of semantic matching information matching the semantic information corresponds to a plurality of answer information, selecting one answer information from the plurality of answer information to be the initial answer information based on at least one of equipment information of the user equipment and application information of an application which sends the text sequence to be processed.

6. The method according to claim 3, wherein the sub-databases comprises at least one ontology instance, each of the at least one ontology instance has at least one property, each of the at least one property comprises one group of semantic matching information and an initial answer information corresponding to the group of semantic matching information, and the method further comprises:
x) obtaining an instance item of an ontology, the ontology having at least one property, and each of the at least one property of the ontology comprising an ontology answer information and one group of semantic matching information with a default item; and
y) processing the default item in the at least one property of the ontology to obtain the ontology instance which inherits all the at least one property of the ontology based on the instance item of the ontology.

7. The method according to claim 1, wherein the step d) comprises:
if it is determined that the initial answer information cannot be directly provided to the user equipment, obtaining parameter information from the semantic information of the word segment;
processing the initial answer information based on the parameter information to obtain the established answer information; and
providing the established answer information to the user equipment.

8. The method according to claim 1, further comprising:
if the text sequence to be processed meets a predetermined trigger condition, obtaining historical search information of the user equipment,
wherein the step c) comprises: by considering the historical search information of the user equipment, performing the search in at least one of the plurality of sub-databases for matching the semantic information, successively from high to low in priority of the sub-databases, till the initial answer information matching the semantic information is found.

9. The method according to claim 1, wherein the semantic information of the word segment comprises at least one of the following: a synonym of the word segment, and/or a combination of synonyms of the word segment, a word that belongs to a same class with the word segment, and/or a combination of words that belong to the same class with the word segment, and an entity having a save or similar structure with the word segment.

10. A question-answering device for acquiring answer information based on a predetermined knowledge database in a computer equipment, wherein the predetermined knowledge database comprises a plurality of sub-databases, and the question-answering device comprises:
a first acquiring device, configured to acquire a text sequence to be processed from a user equipment;
a semantic device, configured to: device the text sequence into a plurality of word segments; and obtain semantic information of at least one of the plurality of word segments;
a retrieval device, configured to: perform a search in at least one of the plurality of sub-databases for matching the semantic information, successively from high to low in priority of the sub-databases, till an initial answer information matching the semantic information is found; and
a first providing device, configured to provide an established answer information corresponding to the initial answer information to the user equipment,
wherein the retrieval device comprises:
a second determining device, configured to: if the answer information, which has a higher matching rate with the semantic information of the word segment than a first threshold, is found in the search, determine the answer information to be the initial answer information; or
a second providing device, configured to: if one or more answer information, which has a higher matching rate with the semantic information of the word segment than a second threshold and lower than the first threshold, is found when the search is completed, provide description information of the one or more answer information to the user equipment; and
a third determining device, configured to: determine answer information which is fed back from the user equipment and corresponds to a portion of the description information which is selected by the user equipment to be the initial answer information.

11. The question-answering device according to claim 10, further comprising:
a first determining device, configured to determine the priority order of the plurality of sub-databases based on the semantic information.

12. The question-answering device according to claim 10, wherein the retrieval device comprises:
a first sub-retrieval device, configured to: perform the search to multiple groups of semantic matching information in at least one of the plurality of sub-databases for matching the semantic information, successively from high to low in priority of the sub-databases, till a group of semantic matching information matching the semantic information is found; and determine answer information corresponding to the group of semantic matching information to be the initial answer information, wherein each of the multiple group of semantic matching information comprises one or more semantic matching structure.

13. The question-answering device according to claim 12, wherein the semantic matching structure comprises at least one of the following items:
   a plurality of words and semantic information of at least one of the plurality of words; and
   logic relations between the plurality of words.

14. The question-answering device according to claim 12, wherein the first sub-retrieval device comprises:
   a second sub-retrieval device, configured to: perform the search to multiple groups of semantic matching information in at least one of the plurality of sub-databases for matching the semantic information, successively from high to low in priority of the sub-databases, till a group of semantic matching information matching the semantic information is found; and
   a selecting device, configured to: if the group of semantic matching information matching the semantic information corresponds to a plurality of answer information, select one answer information from the plurality of answer information to be the initial answer information based on at least one of equipment information of the user equipment and application information of an application which sends the text sequence to be processed.

15. The question-answering device according to claim 12, wherein the sub-databases comprises at least one ontology instance, each of the at least one ontology instance has at least one property, each of the at least one property comprises one group of semantic matching information and an initial answer information corresponding to the group of semantic matching information, and the question-answering device further comprises:
   a second acquiring device, configured to obtain an instance item of an ontology, the ontology having at least one property, and each of the at least one property of the ontology comprising an ontology answer information and one group of semantic matching information with a default item; and
   an instance generating device, configured to process the default item in the at least one property of the ontology to obtain the ontology instance which inherits all the at least one property of the ontology based on the instance item of the ontology.

16. The question-answering device according to claim 10, wherein the first providing device comprises:
   a third acquiring device, configured to: if it is determined that the initial answer information cannot be directly provided to the user equipment, obtain parameter information from the semantic information of the word segment;
   a fourth acquiring device, configured to process the initial answer information based on the parameter information to obtain the established answer information; and
   a third providing device, configured to provide the established answer information to the user equipment.

17. The question-answering device according to claim 10, further comprising:
   a fifth acquiring device, configured to: if the text sequence to be processed meets a predetermined trigger condition, obtain historical search information of the user equipment,
   wherein the retrieval device comprises a third sub-retrieval device, configured to: by considering the historical search information of the user equipment, perform the search in at least one of the plurality of sub-databases for matching the semantic information, successively from high to low in priority of the sub-databases, till an initial answer information matching the semantic information is found.

18. The question-answering device according to claim 10, wherein the semantic information of the word segment comprises at least one of the following: a synonym of the word segment, and/or a combination of synonyms of the word segment, a word that belongs to a same class with the word segment, and/or a combination of words that belong to the same class with the word segment, and an entity having a same or similar structure with the word segment.

19. A computer equipment, comprising question-answering device for acquiring answer information based on a predetermined knowledge database in a computer equipment, wherein the predetermined knowledge database comprises a plurality of sub-databases, and the question-answering device comprises:
   a first acquiring device, configured to acquire a text sequence to be processed from a user equipment;
   a semantic device, configured to: divide the text sequence into a plurality of word segments; and obtain semantic information of at least one of the plurality of word segments;
   a retrieval device, configured to: perform a search in at least one of the plurality of sub-databases for matching the semantic information, successively from high to low in priority of the sub-databases, till an initial answer information matching the semantic information is found; and
   a first providing device, configured to provide an established answer information corresponding to the initial answer information to the user equipment wherein the retrieval device comprises:
   a second determining device, configured to: if the answer information, which has a higher matching rate with the semantic information of the word segment than a first threshold, is found in the search, determine the answer information to be the initial answer information; or
   a second providing device, configured to: if one or more answer information, which has a higher matching rate with the semantic information of the word segment than a second threshold and lower than the first threshold, is found when the search is completed, provide description information of the one or more answer information to the user equipment; and
   a third determining device, configured to: determine answer information which is fed back from the user equipment and corresponds to a portion of the description information which is selected by the user equipment to be the initial answer information.

* * * * *